Nov. 1, 1966 D. L. DE MOSS 3,282,486

DIFFERENTIAL CAPSTAN FOR MULTIPLE TAPE SIZES

Filed Nov. 7, 1963

INVENTOR.
Dean L. DeMoss

By Smyth, Roston & Pavitt
Attorneys

United States Patent Office 3,282,486

Patented Nov. 1, 1966

3,282,486

DIFFERENTIAL CAPSTAN FOR MULTIPLE TAPE SIZES

Dean L. De Moss, Glendale, Calif., assignor to Minnesota Mining and Manufacturing Company, St. Paul, Minn., a corporation of Delaware Filed Nov. 7, 1963, Ser. No. 322,151
3 Claims. (Cl. 226—181)

This invention relates to a tape transport mechanism of the type disclosed in the Mullin Patent 3,093,284 which forms the traveling tape into a tensioned loop having two legs to permit transducer means to be associated with at least one of the two legs for the purpose of recording and reproducing signals.

A tape transport mechanism of this type comprises a drive capstan and two associated nip rollers which cooperate with a return capstan to form the tensioned tape loop. As taught by the Mullin patent, the drive capstan is what may be termed a differential capstan since it has three circumferential driving zones comprising a relatively wide central circumferential driving zone of a given diameter and two narrower end circumferential driving zones of a larger diameter. One nip roller which may have a surface of a suitable elastomer presses the tape against the intermediate circumferential driving zone of the drive capstan to actuate the ingoing leg of the tensioned loop at a given rate of travel. The other nip roller which may also have a surface of a suitable elastomer presses the tape against the two end circumferential driving zones of the larger diameter to drive the outgoing leg of the tensioned loop at a higher rate of travel, the required tension in the tape loop being created by the differential between the ingoing rate and the outgoing rate.

For reasons that are inherent in such an arrangement and that involve the resiliency of the tape, the two tensioned legs of the loop must be relatively short for accurately recording and reproducing signals and consequently the distance between the transducer means and the differential drive capstan must be relatively short. When a multiple channel tape is used, moreover, it becomes necessary to employ a plurality of transducer heads along one leg of the tensioned loop and, of course, increasing the number of transducer heads further shortens the distance between the differential drive capstan and the nearest transducer head.

In the line of development to which the present invention pertains, it has become a requirement that the tape transport system achieve exceedingly high accuracy in recording and reproducing signals over a range of optional tape speeds from a minimum of 7½ inches per second to a maximum of 120 inches per second and with a signal frequency as high as 1½ megacycles. To achieve the required degree of accuracy, it has been necessary to take special measures to reduce drastically heretofore ignored causes of disturbances in the traveling tape. Thus disturbances originating in bearings and in the inertia of the return capstan have been reduced and low frequency resonance in the working parts of the mechanism has been eliminated. It has been further necessary to develop an exceedingly sensitive speed control system employing a servo loop. To achieve the required degree of sensitivity for the successful operation of such a servo loop it has been necessary to minimize inertia in the various moving parts and to employ a high-torque low-inertia motor of the printed circuit type. The degree of accuracy that has been achieved may be appreciated when it is considered that the amount of lead or lag of the high speed tape relative to absolutely constant speed has been reduced to approximately the wave length of green light.

When the Mullin type tape transport arrangement for driving one-inch tape was used under these exacting conditions, two difficulties were encountered. The first difficulty was excessive and uneven wear on the transducer heads. The second difficulty was loss of signal strength. As a result of careful research it was discovered that the two difficulties have the same cause, the common cause being certain lines of tension created in the traveling tape by the differential drive capstan.

As will be explained, these lines of tension originate at the spaced circumferential shoulders of the drive capstan that define the central circumferential driving zone of reduced diameter. The two lines of tension in the tape curve toward each other across the surface of the nearest transducer head and converge together beyond the transducer head. The excessive wear on the transducer head occurs at these lines of tension and the loss in signal strength results from slight buckling of the tape along the lines of tensions.

The loss of signal strength can be appreciated when it is considered that a gap of only half a wave length between the tape and a transducer head results in a loss of 55 decibels in the signal strength. With the tape traveling at the maximum speed of 120 inches per second, a signal of a frequency of 1½ megacycles has a wave length on the tape of only .000080 inch and such an exceedingly minute departure from the surface of the transducer can be avoided only by tensioning the tape uniformly across the width of the tape at the transducer head with buckling completely eliminated.

The discovery of the cause of the defect poses the problem of eliminating the cause. Since the lines of tension in the tape converge together, the problem could be solved by increasing the distance of the transducer head from the drive capstan but, as heretofore stated, it is highly desirable that the tensioned tape loop be relatively short. Since converging lines of tape tension are inherent in the operation of a Mullin tape differential drive capstan, the solution must be to find some way to cause the lines of tension to converge together short of the first transducer head.

As heretofore stated, the Mullin type drive capstan has three circumferential driving zones, namely, two end zones and a central zone, the central zone being of smaller diameter than the two end zones, and the two lines of tape tension originating at the two boundaries of the central zone. The solution to the problem taught by the present invention is to shape the differential drive capstan with five alternate circumferential driving zones instead of three alternate circumferential driving zones. The five zones are two end zones and a central zone all of the same diameter and two intermediate zones of different diameter.

This increase in the number of alternate circumferential drive zones narrows the spacing between the converging lines of tension in the tape and thus reduces the distance from the drive capstan at which the two lines of tension converge together and disappear. Uniform tension across the width of the tape is established before the tape reaches the first transducer head on the ingoing leg of the tape loop and this uniform tension prevails until the traveling tape passes beyond the last transducer head on the outgoing leg of the tape loop.

An important and unexpected advantage of the new tape transport mechanism is that a differential capstan with five driving zones can be used interchangeably with one inch tape and one half inch tape. One half of a five-zone 2 inch differential capstan is physically equivalent to a conventional three-zone differential capstan and the tension lines produced thereby are close enough together to serve the purpose of the present invention.

The fact that the new capstan can be used with either one inch tape or one half inch tape greatly simplifies the task of changing over the apparatus from one tape size to the other. Heretofore it has been necessary to substitute one tape drive mechanism for another. Since the drive motor is directly coupled to the differential drive capstan, it has also been necessary to substitute a new motor along with the new differential drive capstan.

The features and advantages of the invention may be understood from the following detailed description and the accompanying drawing.

In the drawing, which is to be regarded as merely illustrative:

FIG. 1 is a plan view of tape transport mechanism of the type disclosed in the previously mentioned Mullin patent and this plan view also applies to the present embodiment of applicant's invention.

Figure 1:
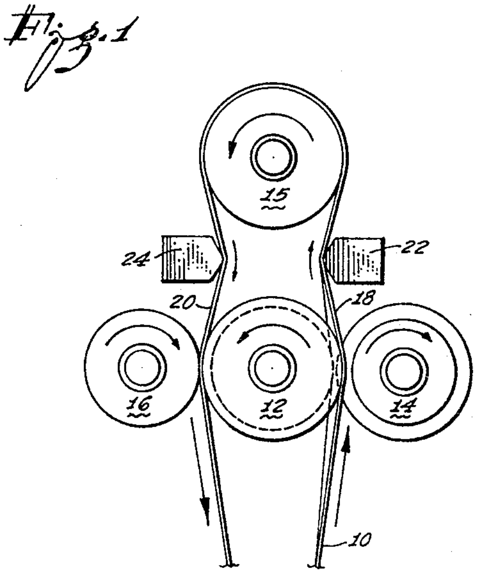
FIG. 1 is a plan view of a tape transport mechanism incorporating a differential drive capstan.

In FIG. 1, a tape 10 is engaged by a drive capstan 12 in cooperation with a first nip roller 14 to drive the tape at a given speed. The tape passes around a reversing capstan or idler 15 and then is again engaged by the drive capstan 12 in cooperation with a second nip roller 16 to drive the tape at a higher speed. The speed differential together with the reversing capstan 15 causes the tape to form a tensioned loop with an outgoing leg 18 of the loop extending from the drive capstan 12 to the reversing capstan 15 and an ingoing leg 20 extending from the reversing capstan to the drive capstan.

In the arrangement shown in FIG. 1, there is a single transducer 22 in contact with the outgoing leg 18, which transducer may be a recording head, and a second transducer 24 is in contact with the ingoing leg 20, which transducer may be a reading head. As heretofore stated additional transducers may be employed for multiple-channel high-speed recording, there being, for example, four transducers with two on each side of the tensioned loop. Since it is desirable to keep the loop relatively short as shown, the additional transducers necessarily decrease the distance of the drive capstan 12 from the nearest transducer along each of the two legs of the loop.

Figure 2:
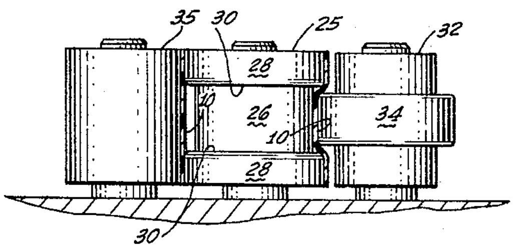
Fig. 2 PRIOR ART
FIG. 2 is an elevational view of a three-zone differential drive capstan and the associated two nip rollers.

FIG. 2 is an elevational view of a Mullin type driving mechanism such as shown in FIG. 1, the tape being shown in section. In FIG. 2, a differential drive capstan 25 has a central circumferential driving zone 26 and two adjacent end circumferential driving zones 28, the diameter of the two end zones 28 being larger than the diameter of the central zone 26. The central circumferential driving zone 26 which is bounded by two circumferential shoulders 30 is approximately twice as wide as each of the two end circumferential driving zones 28. Thus, approximately half of the width of the tape 10 is coextensive with the central zone 26, the other half being coextensive in width with the two end zones 28.

A first nip roller 32 is dimensioned to clear the two end circumferential drive zones 28 of the drive capstan 25 and has a central circumferential enlargement 34 to press the longitudinal central portion of the tape 10 against the central circumferential driving zone 26 of the drive capstan. Thus the first nip roller 32 cooperates with the differential capstan 25 to drive the tape 10 at the peripheral speed of the central zone 26 of the drive capstan. On the other hand, the second nip roller 35 clears the central circumferential driving zone 26 and presses the tape against the two end circumferential driving zones 28 of the driving capstan to drive the tape at the higher peripheral speed of the two end zones.

Figure 3:
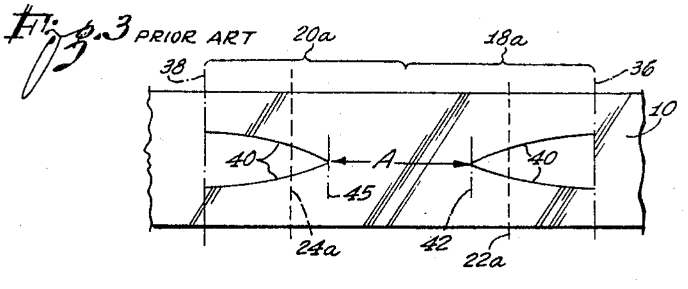
Fig. 3 PRIOR ART
FIG. 3 is a diagram showing the two pairs of converging lines of tension created in the tape by the differential capstan arrangement shown in FIG. 2.

As heretofore indicated the present invention is directed to the elimination of difficulties that arise when the differential drive arrangement shown in FIG. 2 is employed to drive a tape that is one inch wide. The cause of the difficulties may be clearly understood from FIG. 3 which is a diagrammatic view of the tape loop straightened out or unfolded. In FIG. 3, the broken line 36 represents the region where the first nip roller 32 presses the tape into contact with the differential drive capstan 25 and the broken line 38 represents the region where the second nip roller 35 presses the tape against the drive capstan. Thus the outgoing leg 18 in FIG. 1 is of the extent indicated by the bracket **18*a* and the ingoing leg 20 is of the extent indicated by the bracket 20*a*. The broken line 22*a* represents the region of contact with the tape of the transducer 22 and the broken line 24*a* represents the region of contact of the transducer 24** with the tape.

As heretofore indicated the converging lines of tension in the loop of the tape originate in the region of the two circumferential shoulders 30 of the differential drive capstan 25. FIG. 3 shows a pair of lines of tension 40 in the outgoing leg that meet at a point on a transverse broken line 42. In like manner FIG. 3 shows a pair of lines of tension 44 in the ingoing leg of the tensioned loop that converge at a point on a second transverse broken line 42.

It has been discovered that because of these two pairs of converging lines of tension the only portion of the tape that is of uniform tension across its width is the portion along the longitudinal dimension designated "A" in FIG. 3, the length of the dimension being defined by the two transverse lines 42 and 44 through the points of convergence of the two pairs of tension lines. Since each of the two broken lines **22*a* and 24*a* which represent the two transducers 22 and 24** are intersected by the two pairs respectively of the tension lines the pressure of the tape against the two transducers is not uniform across the width of the tape. It is this discovery, which is not readily apparent, that accounts both for the uneven wear on each of the two transducers and accounts for the heretofore unaccountable loss in signal strength.

Figure 4:
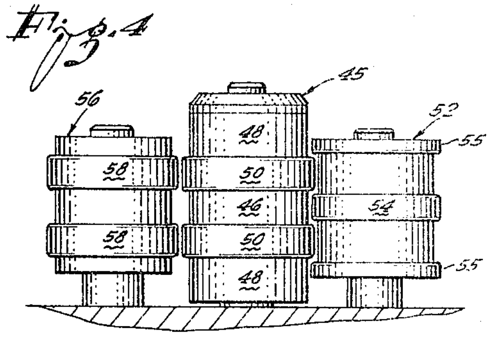
FIG. 4 is an elevational view similar to FIG. 2 showing a five-zone differential capstan arrangement dimensioned to handle a tape that is one inch in width.

FIG. 4 shows an embodiment of applicant's drive mechanism for a tape one inch wide. The differential drive capstan 45 has a central circumferential drive zone 46 of a given diameter, two end circumferential driving zones 48 of the same diameter and two intermediate circumferential driving zones 50 of a larger diameter. The first nip roller 52 is cut away to clear the two intermediate circumferential driving zones 50 of the drive capstan and is formed with a central circumferential enlargement 54 to cooperate with the central circumferential driving zone 46 and is further formed with two circumferential end enlargements 55 to cooperate with the two end circumferential driving zones 48 of the capstan. The second nip roller 56 may be of uniform diameter but in the construction shown has two circumferential enlargements 58 which cooperate respectively with the two intermediate circumferential driving zones 50 of the capstan.

Figure 5:
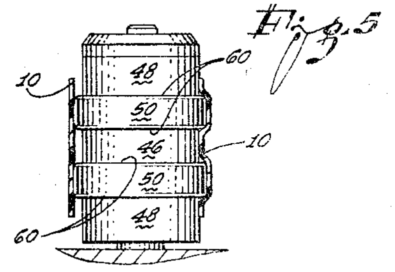
FIG. 5 is an elevational view of the five-zone differential capstan in FIG. 4 showing how a tape that is one inch in width is related to the capstan.

FIG. 5 shows the manner in which the one inch tape makes contact with the differential capstan 45 under the pressure of the two cooperating nip rollers 52 and 56. The first nip roller 52 effectively presses the tape against the drive capstan 45 only in the region of the central zone 46 and the two end zones 48 to drive the tape at a given speed. On the other hand, the second nip roller 56 presses the tape against only the two intermediate circumferential driving zones 50 to drive the tape at a somewhat higher speed for the purpose of placing the loop of tape under tension.

Figure 6:
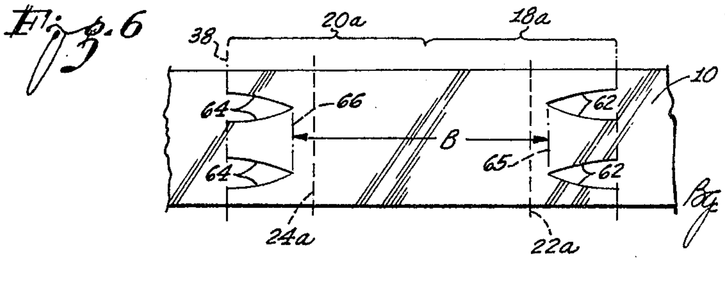
FIG. 6 is a diagrammatic view similar to FIG. 3 showing how the five-zone capstan shown in FIG. 5 creates four pairs of diverging lines of tension instead of two pairs with the four pairs substantially shorter than the two pairs of converging lines of tension that are created by the arrangement shown in FIG. 2 when the arrangement shown in FIG. 2 is employed with a tape that is one inch wide.

FIG. 6 is a diagram similar to FIG. 3 representing the state of the traveling tape as created by the driving mechanism shown in FIG. 4. The difference in FIG. 6 over FIG. 3 is in the creation of two pairs of diverging lines of tension at each end of the tensioned loop instead of a single pair, each pair of converging lines of tension originating at the two opposite circumferential shoulders 60 of an intermediate circumferential driving zone 50 of the drive capstan 45.

In FIG. 6 there are two pairs of converging lines of tension 62 at the beginning of the outgoing leg **18*a* and there are two pairs of similar converging lines of tension 64 at the end of the ingoing leg 20*a*. The pairs of tension lines 62 converge at points on a transverse line 65 and the converging lines of tension 64 converge at points on a transverse line 66. Thus, the tape is under uniform tension across its width along the longitudinal dimension "B." The important fact to note is that the longitudinal dimension "B" is sufficiently longer than the longitudinal dimension "A" of FIG. 3 to include the two transverse lines 22*a* and 24*a*** where the two transducers make contact with the tensioned tape.

Figure 7:
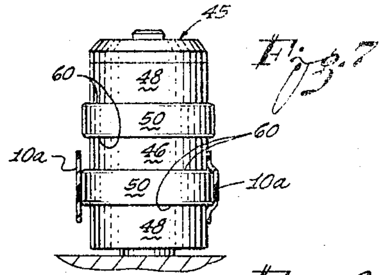
FIG. 7 is a view similar to FIG. 5 showing how the five-zone differential capstan cooperates with a tape that is one-half inch in width.

FIG. 7 shows how a tape **10*a* of a width of a half an inch is pressed against the capstan 45 by the two nip rollers 52 and 56. It is to be noted that the tape 10*a* is positioned symmetrically relative to the lower intermediate circumferential driving zone 50 of the capstan 45, a central longitudinal portion of approximately half the width of the tape 10*a* being coextensive with the lower intermediate circumferential driving zone 50 of the capstan 45 and two opposite longitudinal marginal portions of the tape of a total of ½ of the width of the tape lying against the central circumferential driving zone 46 and the end circumferential driving zone 48** respectively. Thus the driving mechanism functions with a half inch tape as well as with a one inch tape to achieve the objectives of the invention and makes it unnecessary to substitute one drive mechanism for another when a change-over is made from ½ inch tape to a one inch tape or from a one inch tape to ½ inch tape.

Figure 8:
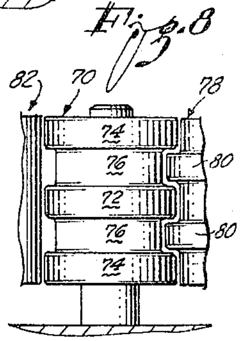
FIG. 8 is a fragmentary elevational view similar to FIG. 4 showing a second embodiment of the invention.

FIG. 8 indicates how the invention may be embodied with a certain reversal in configuration, large diameter zones being substituted for small diameter zones of the capstan 45 and small diameter zones being substituted for large diameter zones of the capstan. The configuration of the two nip rollers is changed accordingly.

In FIG. 8, the differential drive capstan 70 has a central circumferential driving zone 72 and two end circumferential driving zones 74 all of the same diameter and further has two intermediate circumferential driving zones 76 of lesser diameter. The associated first nip roller 78 is dimensioned to clear the circumferential driving zones 72 and 74 and is formed with two circumferential enlargements 80 to press the traveling tape against the corresponding intermediate circumferential driving zones 76 of the capstan. The second nip roller 82 is of uniform diameter to press the tape against the circumferential driving zones 72 and 74 of the capstan.

My description in specific detail of the selected embodiments of the invention will suggest various changes, substitutions and other departures from my disclosure within the spirit and scope of the appended claims. For example, it is apparent that the type of differential capstan described herein may be used with any combination of taps widths by forming the capstan with the appropriate number and arrangement of portions of relatively large and relatively small diameter. It is also apparent that the number of differential steps for a given width of tape may be increased to obtain uniform tape tension closer to the capstan and thus permit shortening the tensioned tape loop as well as placing a transducer head closer to the capstan.

I claim:

1. A drive mechanism for use interchangeably with a first tape of a first width and a second tape of a second width less than the first width to form the tape into a tensioned loop around a return capstan with an ingoing leg of the loop traveling from the drive mechanism to the return capstan and an outgoing leg of the tensioned loop traveling from the return capstan to the drive mechanism and with transducer means adjacent at least one of the two legs in an area of substantially uniform tension, said drive mechanism comprising:

a rotary drive capstan;

a first nip roller cooperative with the drive capstan to drive the ingoing leg of the loop;

and a second nip roller cooperative with the drive capstan to drive the outgoing leg of the loop, the drive capstan having a peripheral driving area comprising five circumferentially flat driving zones to drive the first tape, namely a central circumferentially flat driving zone of a given diameter, two end circumferentially flat driving end zones of the same diameter and two intermediate circumferentially flat driving zones of a different diameter, substantially one half of the peripheral driving area being adapted to drive the record tape of the second width, the one-half of the peripheral driving area comprising approximately a half portion of the central zone, a particular portion of the end zone of substantially the same width as the half portion of the central zone and the full width of the corresponding intermediate driving zone, the width of the intermediate driving zone being approximately equal to the sum of the widths of the half portion of the central zone and the particular portion of the end zone, one of the two nip rollers having three circumferential portions of a diameter to cooperate respectively with the central circumferential driving zone and the two end circumferential driving zones of the drive capstan, the other of the two nip rollers having two circumferential zones of a diameter to cooperate respectively with the two intermediate zones of the drive capstan.

2. A combination as set forth in claim 1 in which the two intermediate zones of the drive capstan are of the larger diameter; and the first nip roller has three circumferential enlargements to cooperate with the central zone and the two end zones respectively.

3. A combination as set forth in claim 1 in which the central zone and the two end zones are of the larger diameter;

and the first nip roller has two circumferential enlargements to cooperate with the two intermediate zones respectively.

References Cited by the Examiner

UNITED STATES PATENTS

| | | | |
|---|---|---|---|
| 2,786,672 | 3/1957 | Humphner | 242—55.12 |
| 2,881,984 | 4/1959 | Dyken | 242—66 |
| 2,913,192 | 11/1959 | Mullin | 226—176 X |
| 3,099,376 | 7/1963 | Kennedy | 226—190 X |
| 3,123,271 | 3/1964 | Johnson | 226—176 X |
| 3,132,785 | 5/1964 | Kunz | 226—190 X |

ROBERT B. REEVES, *Primary Examiner.*

S. ALPERT, *Assistant Examiner.*